United States Patent
Jay

(10) Patent No.: US 10,435,097 B2
(45) Date of Patent: Oct. 8, 2019

(54) BICYCLE SEAT FOR PROTECTING ISCHIAL TUBEROSITIES

(71) Applicant: Eric C. Jay, Boulder, CO (US)

(72) Inventor: Eric C. Jay, Boulder, CO (US)

(73) Assignee: Jarik Medical, LLC, Boulder, CO (US)

( * ) Notice: Subject to any disclaimer, the term of this patent is extended or adjusted under 35 U.S.C. 154(b) by 0 days.

(21) Appl. No.: 14/947,299

(22) Filed: Nov. 20, 2015

(65) Prior Publication Data

US 2016/0144914 A1 May 26, 2016

Related U.S. Application Data

(60) Provisional application No. 62/084,621, filed on Nov. 26, 2014.

(51) Int. Cl.
*B62J 1/18* (2006.01)
*B62J 1/00* (2006.01)

(52) U.S. Cl.
CPC ............... *B62J 1/005* (2013.01); *B62J 1/007* (2013.01); *B62J 1/18* (2013.01)

(58) Field of Classification Search
CPC ..... B62J 1/005; B62J 1/007; B62J 1/18; B62J 1/20; B62J 1/22
See application file for complete search history.

(56) References Cited

U.S. PATENT DOCUMENTS

| | | | | |
|---|---|---|---|---|
| 872,124 A | * | 11/1907 | Hammaren | B62J 1/005 |
| | | | | 297/201 |
| 3,308,491 A | * | 3/1967 | Spence | A47C 7/18 |
| | | | | 5/676 |
| 4,218,090 A | * | 8/1980 | Hoffacker | B62J 1/22 |
| | | | | 297/202 |
| 4,842,257 A | * | 6/1989 | Abu-Isa | B60N 2/7011 |
| | | | | 264/176.1 |
| 4,869,554 A | * | 9/1989 | Abu-Isa | A47C 7/282 |
| | | | | 297/452.56 |

(Continued)

FOREIGN PATENT DOCUMENTS

| EP | 0653279 A1 | 12/1993 |
|---|---|---|
| EP | 0653279 A1 | 5/1995 |

(Continued)

OTHER PUBLICATIONS

PCT International Search Report, Application PCT/US2015/061744, dated Feb. 9, 2016.

(Continued)

*Primary Examiner* — Timothy J Brindley
(74) *Attorney, Agent, or Firm* — MacMillan, Sobanski & Todd, LLC

(57) ABSTRACT

A bicycle seat has a bicycle saddle with a forward end and a rearward end, the saddle having an ischial region. One or more cushioning pads are placed on the saddle in the ischial region. The cushioning pads have an upper surface, with the cushioning pads being connected to the saddle in a manner that enables the upper surface of the cushioning pads to move either from side to side with respect to the saddle during pedaling, or forward and rearward with respect to the saddle during pedaling, or both from side to side and forward and rearward during pedaling.

25 Claims, 10 Drawing Sheets

(56) References Cited

U.S. PATENT DOCUMENTS

| | | | |
|---|---|---|---|
| 4,945,571 A | 8/1990 | Calvert | |
| 4,952,439 A | 8/1990 | Hanson | |
| 5,020,852 A | 6/1991 | Marion | |
| 5,108,076 A | 4/1992 | Chiarella | |
| 5,121,962 A * | 6/1992 | Weber | A41D 19/01523 297/199 |
| 5,147,685 A * | 9/1992 | Hanson | B62J 1/18 297/214 |
| 5,165,752 A | 11/1992 | Terry | |
| 5,203,607 A | 4/1993 | Landi | |
| 5,280,993 A | 1/1994 | Hsh | |
| 5,286,082 A | 2/1994 | Hanson | |
| 5,356,205 A | 10/1994 | Calvert et al. | |
| 5,490,299 A * | 2/1996 | Dinsmoor, III | A47C 7/021 297/452.41 |
| 5,636,896 A * | 6/1997 | Howard | B62J 1/26 297/199 |
| 5,720,518 A * | 2/1998 | Harrison | B62J 1/26 297/202 |
| 5,738,406 A | 4/1998 | Deus | |
| 6,244,655 B1 | 6/2001 | Minkow et al. | |
| 6,305,743 B1 * | 10/2001 | Wheeler | B62J 1/26 297/199 |
| 6,609,751 B1 * | 8/2003 | Angelo | B62J 1/005 297/195.1 |
| 6,827,397 B1 | 12/2004 | Driver | |
| 7,341,308 B2 | 3/2008 | Milton | |
| 8,128,164 B2 | 3/2012 | Segato | |
| 9,073,469 B2 * | 7/2015 | Fujikawa | B60N 2/72 |
| 2003/0025364 A1 * | 2/2003 | Antonio | B62J 1/00 297/202 |
| 2003/0067195 A1 * | 4/2003 | Sylvester | B62J 1/005 297/201 |
| 2005/0212337 A1 | 9/2005 | Lee | |
| 2007/0069556 A1 * | 3/2007 | Bleloch | B62J 1/10 297/195.1 |
| 2007/0200399 A1 | 8/2007 | Riondato | |
| 2008/0001445 A1 | 1/2008 | Lee | |
| 2008/0007099 A1 | 1/2008 | Chuang | |
| 2008/0093898 A1 | 4/2008 | Chiang | |
| 2008/0179925 A1 * | 7/2008 | Chuang | B62J 1/005 297/214 |
| 2008/0197680 A1 * | 8/2008 | Chuang | B62J 1/002 297/214 |
| 2010/0123339 A1 * | 5/2010 | Wen | B62J 1/005 297/201 |
| 2010/0132120 A1 * | 6/2010 | Koerlin | A61G 5/1043 5/654 |
| 2011/0018315 A1 * | 1/2011 | DeRoy | B62J 1/002 297/202 |
| 2012/0031800 A1 * | 2/2012 | Nilson | C08K 5/01 206/524.1 |
| 2012/0299359 A1 * | 11/2012 | Abe | B60N 2/70 297/452.56 |
| 2013/0147151 A1 * | 6/2013 | Noble | B62J 1/00 280/259 |
| 2014/0054937 A1 * | 2/2014 | Sam | B62J 1/22 297/214 |
| 2014/0182049 A1 * | 7/2014 | Prust | A47C 7/021 2/410 |
| 2014/0375092 A1 * | 12/2014 | Curless | B62J 1/005 297/201 |
| 2015/0251717 A1 * | 9/2015 | Portz | B62J 1/005 297/201 |
| 2016/0007671 A1 * | 1/2016 | Prust | A47C 27/144 2/411 |
| 2017/0036724 A1 * | 2/2017 | Yu | B29C 43/203 |

FOREIGN PATENT DOCUMENTS

| | | |
|---|---|---|
| WO | 98/31584 A1 | 7/1998 |
| WO | 1998/031584 A1 | 7/1998 |

OTHER PUBLICATIONS

PCT International Search Report and the Written Opinion, Application No. PCT/US2015/061744 filed Nov. 20, 2015, dated Feb. 9, 2016.

* cited by examiner

BICYCLE SEAT FOR PROTECTING ISCHIAL TUBEROSITIES

RELATED APPLICATIONS

This application claims priority from U.S. Provisional Patent Application Ser. No. 62/084,621, filed Nov. 26, 2014, and entitled BICYCLE SEAT.

TECHNICAL FIELD

This invention relates to bicycle seats, and in particular to bicycle seats that provide comfortable seating for bicycle riders.

BACKGROUND OF THE INVENTION

The design of bicycle seats has evolved to reduce the weight, thickness and bulk of the seats. Also, there has been a major emphasis on relieving pressure in the perineal area (between the anus and the genitals), in order to prevent pain, genital numbness, occlusion of blood-flow and penile dysfunction. As the areas of relief, usually in the form of a cutaways, have expanded, there has been a resulting trend toward loading the majority of the bicycle rider's weight on the ischial tuberosities (ischials or seat bones).

The tendency to load more and more pressure on the ischials is further heightened by two factors. First, the upright sitting posture of mountain bikes and hybrid bikes results in a more vertical contact of the ischials against the saddle. When the rider leans forward on a racing bike, the ischials point more to the rear and take less pressure, but the upright posture increases ischial pressure. Second, as people age, the tissues and muscles beneath the ischials tend to atrophy or waste away, making the ischials protrude more and take more pressure.

As a result, more and more riders suffer some degree of pain at the ischials, particularly during bike rides of an hour or more. To help mitigate this, riders are taught to shift weight and stand on their pedals regularly. Others use salves to reduce chafing. For some riders, the pain becomes intense enough that they have to stop riding. Others develop saddle sores or swelling on the ischials that is indicative of ischial bursitis (an inflammation of the bursal sac located in the gluteal region).

Another area of common abrasion and chafing lies in the bone structure (pubis) forward of the ischials, as they also scrape and abrade against the saddle during riding. This is particularly true for women who tend to put more pressure on the pubic bones, about 7 cm forward of the ischial tuberosities. Large numbers of women have given up cycling because of this pain. Similar increased pressure is also experienced by men riding in the racing position.

It would be advantageous if an improved bicycle seat could be developed.

SUMMARY OF THE INVENTION

According to this invention there is provided a bicycle seat having a bicycle saddle with a forward end and a rearward end, the saddle having an ischial region, and one or more cushioning pads placed on the saddle in the ischial region. The cushioning pads have an upper surface, with the cushioning pads being connected to the saddle in a manner that enables the upper surface of the cushioning pads to move either from side to side with respect to the saddle during pedaling, or forward and rearward with respect to the saddle during pedaling, or both from side to side and forward and rearward during pedaling.

According to this invention there is also provided a bicycle seat having a bicycle saddle with a forward end and a rearward end, the saddle having a pubis region. One or more pubis cushioning pads are positioned in the pubis region, the pubis cushioning pads having an upper surface. The pubis cushioning pads are attached to the saddle in a manner to allow the upper surface to move either from side to side with respect to the saddle during pedaling, or forward and rearward with respect to the saddle during pedaling, or both from side to side and forward and rearward during pedaling.

According to this invention there is also provided a bicycle seat having a bicycle saddle with a forward end and a rearward end, the saddle having an ischial region. One or more cushioning pads are placed on the saddle in the ischial region, the cushioning pads containing a cushioning fluid. The cushioning pads have an upper surface. The bicycle saddle further has a rear shelf positioned rearward of the ischial region, with the rear shelf being higher than the ischial region by an amount within the range of from about 1 cm to about 6 cm, thereby enabling support of a substantial portion of the rider's weight on the rear shelf while minimizing the weight borne at the ischial region.

Various advantages of this invention will become apparent to those skilled in the art from the following detailed description of the preferred embodiment, when read in light of the accompanying drawings.

DETAILED DESCRIPTION OF THE INVENTION

Figure 1:
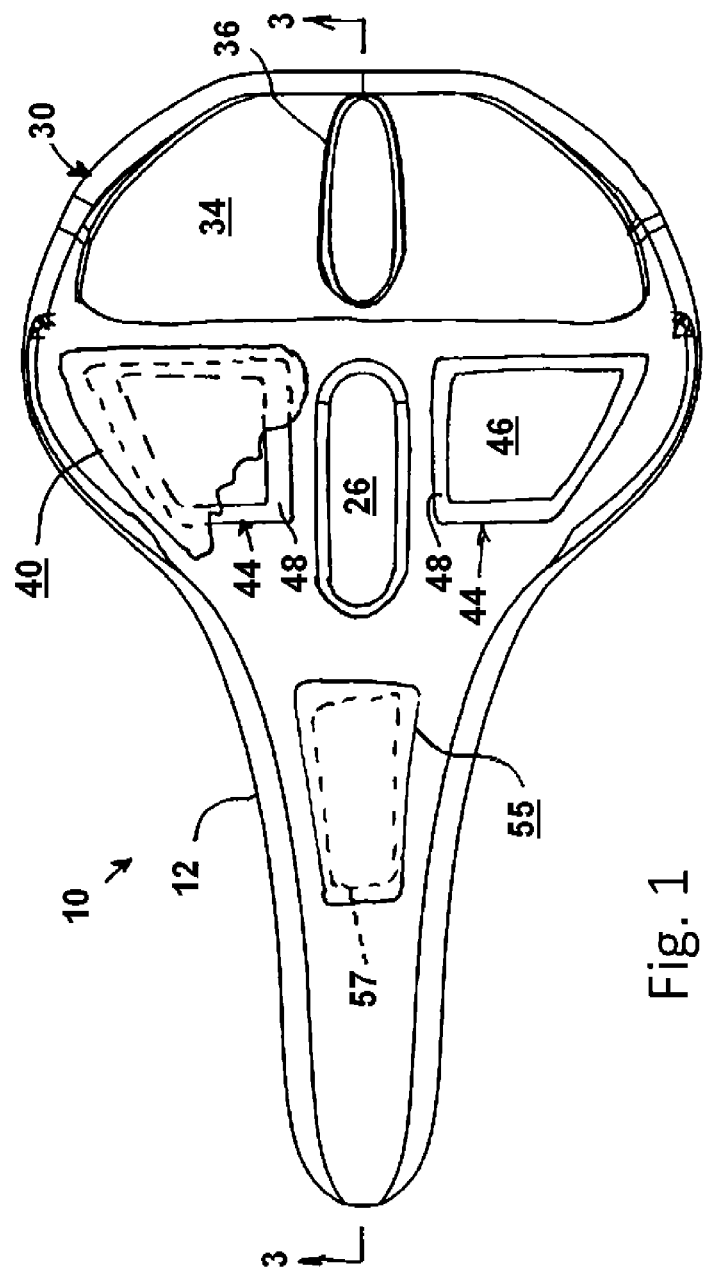
FIG. 1 is a partially cut away plan view of a bicycle seat, including a saddle.

The description and drawings disclose various embodiments of bicycle seats. It is to be understood that the term "bicycle seat" includes, in addition to seats for bicycles, seats for other multi-wheeled devices, such as tricycles and motorcycles, and also includes seats for exercise machines.

It has been discovered that the use of foams and gels in bike seats to reduce pressure on the boney prominences (ischials and pubic structure) is largely ineffective because these materials have memory. The more they are compressed vertically or stretched laterally, the more they push back to remember their original shape, thus applying a relentless pressure to the boney structures during weight-bearing activities. This is further exacerbated by the firmness of the materials used in order to provide proper stability and push-off for pedaling power. More importantly, commonly used foams and gels cannot relieve the shear forces that are created from the movement of the boney prominences against the underlying tissue as the rider pedals. Commonly used foams and gels do not provide sufficient lateral movement to neutralize shear and abrasion forces. These prominences move laterally as the rider shifts from one side of the seat to the other during the pedaling stroke. This side-to-side or lateral movement creates a scraping of the tissue between the bone and the seat, thereby increasing the effect of the pressure.

Another area of high pressure and shear is at the pubis, creating intense pain behind the genitals. Relief is sometimes sought by using salves, but this is messy and not always effective. The common central cutout sometimes ameliorates this problem, but in some cases aggravates the problem because of rubbing at the edges of the cutout.

In addition to lateral movement during pedaling, there is another movement—a forward/rearward shearing movement of the tissue and muscle against the ischial bone. This tissue and muscle move about one inch or more forward, then backward against the bone during every full pedal rotation, thereby causing even more pain at the ischials.

It is known that cushioning fluids can be used to relieve pressure forces because they flow from points of high pressure to points of low pressure to automatically conform to the bicycle rider and reduce peak pressure points at boney prominences (as long as they do not bottom out, and as long as the fluid is encased in a casing that is loose or elastic enough to allow the fluid to conform without any hammocking or resistance from the casing). Advantageously, the cushioning fluids have no memory. Examples of cushioning fluids that would work for pressure relief are known in the field of wheelchair seating.

As shown in FIGS. 1-4, a bicycle seat indicated generally at 10 includes a saddle 12 and a support system 14. The support system can be comprised of plastic shell and a pair of support rails 16 that can be used to attach the saddle to the bicycle while allowing pitch and height adjustments. Other structures for the support system can be used. The saddle has a forward end 15a and a rearward end 15b.

For purposes of description, the bicycle seat can be viewed as having four regions, a front region 18, a pubis region 20, an ischial region 22, and a rear shelf region 24. In the front region 18, the forward portion of the saddle can be substantially flat, bending down only at the very front part of the forward nose. The front region 18 can have any suitable thickness (as viewed in FIG. 2). In one embodiment the thickness is about 2½ cm. Other thicknesses and configurations can be used.

The saddle 12 is usually widest in the ischial region 22, corresponding to where the ischials normally are positioned during riding. In one embodiment, the saddle 12 is relatively wide at the point of the ischials and for a substantial portion of the rear shelf region 24. This extra width provides more surface area over which to distribute the rider's weight, thus further reducing pressure, shear and pain at the ischials. Also, by making the saddle even wider behind the ischials there will be little interference with leg movement during pedaling.

Figure 2:
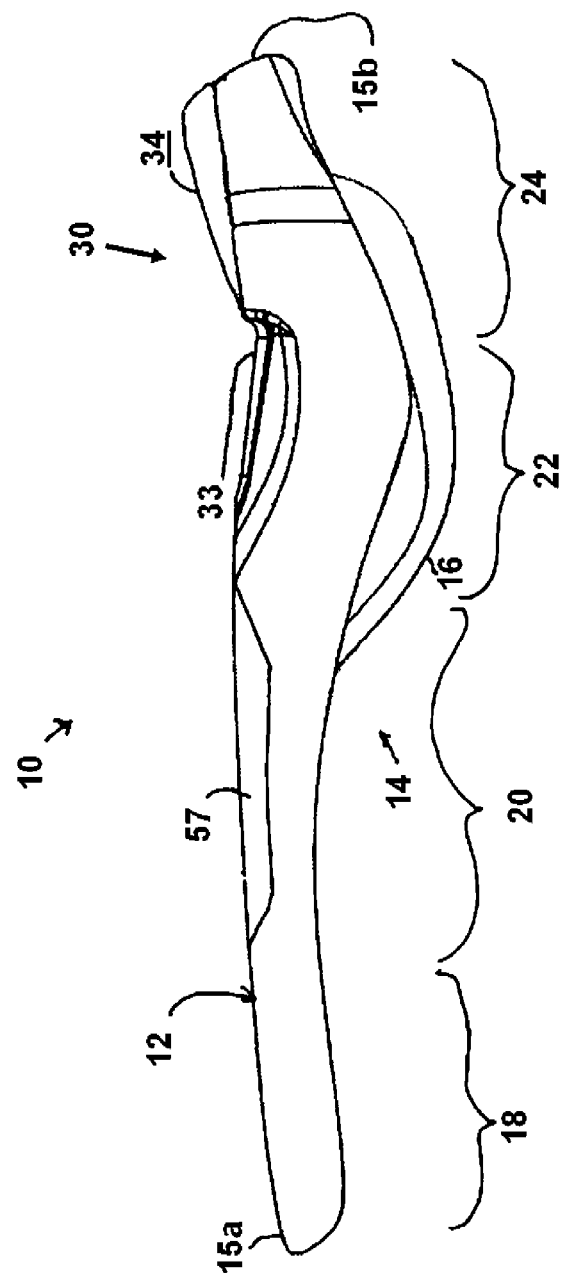
FIG. 2 is a elevational view the bicycle seat of FIG. 1.

As shown in FIG. 2, the saddle can be slightly recessed in the ischial region 22. Optionally, as shown in FIG. 1, the saddle 12 includes a center cutout 26 extending through portions of the ischial region 22, and possibly through portions of the pubis region 20, for pressure relief. The purpose of the center cutout 26 is to provide relief for the pudendal nerve to avoid or minimize possible issues of erectile dysfunction due to the pressure. This cutout is optional. The center cutout 26 can be of any suitable size and shape. In one embodiment, the center cutout is about 9 cm in length. The center cutout 26 also provides enhanced airflow to deal with moisture from perspiration.

The rear shelf region 24 has a rear shelf 30 that is positioned immediately behind the normal position of the ischials. The rear shelf 30 has a sloped upper surface profile 34 that rises gradually toward the rearward end 15b of the saddle 12. In this embodiment the back or high point of the saddle is higher than a top surface 33 of the ischial region 22 of the saddle by an amount within the range of from about 0.5 cm to about 6 cm. In a specific embodiment the back or high point of the saddle is higher than the top surface 33 of the ischial region 22 of the saddle by an amount of about 2 cm. The structure of this specific embodiment provides good pressure relief for the ischials while still allowing movement on the saddle during riding. This structure causes a significant portion of the weight of the rider to be borne by the rider's fatty and muscular tissue rearward of the ischials. The rear shelf 30 relieves pressure on the skin and underlying tissue beneath the ischials when the rider is seated on the seat 10. The rear shelf 30 can be made of any suitable material, such as a foam material.

The rise of the rear shelf 30 above the general level of the upper surface 33 of the ischial region 22, rearward of the expected region of the ischials, is in sharp contrast to the conventional cutouts or cavities for ischial relief where the height of the cutouts is substantially uniform around the entire perimeter of the cutouts. The use of a uniform height structure around the cutouts, a common arrangement in conventional ischial relief structures, does not allow for sufficient pressure to be applied by the foam around the cutouts for pressure relief at the ischials. Most importantly, a uniform height structure does not allow enough movement of the surface of the fluid-filled pad to relieve shear. Thus, in contrast to conventional systems, the use of the rear shelf 30 provides substantial support behind the ischials while allowing the fluid-filled pad to move relatively freely to relieve shear.

Figure 6:
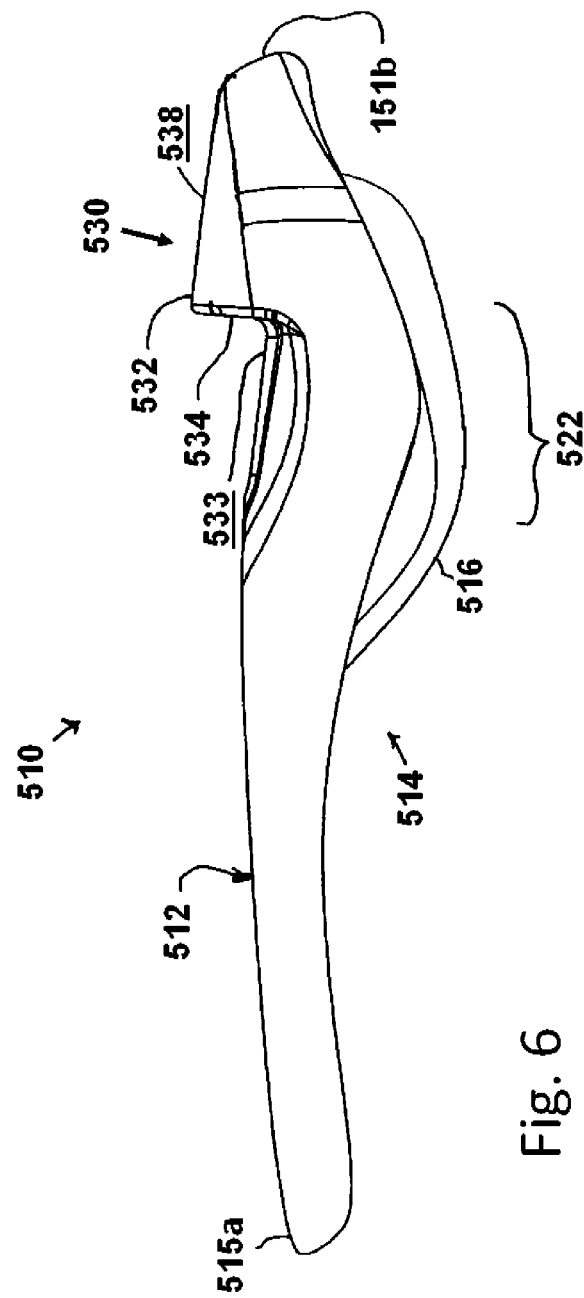
FIG. 6 is a view similar to FIG. 2, but showing an alternate embodiment of the rear shelf.

An alternative embodiment, shown in FIG. 6, includes a seat 510, saddle 512, ischial region 522, and rear shelf 530. The sloped profile 534 is very steep, providing a sharper increase in elevation from the top surface 533 of the ischial region 522 to the rear shelf 530. In this particular embodiment the rear shelf 530 includes an optional rearwardly sloping surface 538. The rearwardly downward sloping upper surface 538 helps prevent or retard forward sliding of the rider during pedaling. The back or high point of the rear shelf 530 is higher than the top surface 533 of the ischial region 522 of the saddle by an amount within the range of from about 0.5 cm to about 6 cm. Optionally, the rear shelf 530 can be in the form of a wedge, and can have a substantially wedge-shaped cross-sectional profile. Other shapes can be used.

Referring back to FIGS. 1-4, the rear shelf region 24 includes an optional rear shelf central depression or cutout 36 to provide additional pressure relief for the perineal area. The rear shelf central cutout 36 can be of any suitable size and shape.

The saddle 12, including the rear shelf 30, is made of a foam material, or other cushioning material. The saddle 12 must have sufficient structural integrity to bear all of or a substantial portion of the rider's weight.

As shown in FIG. 1, the ischial region 22 of the saddle 12 can include two ischial cavities 44, one positioned on the right side of the saddle 12 and one on the left side. The cavities 44 can include a substantially flat bottom surface 46 and sloping wall 48. Other shapes and configurations for the cavities 44 can be used. The cavities 44 are positioned so that they will provide pressure relief at the point of the ischials when the rider is sitting on the seat 10. The depth of the cavities 44 can be within the range of from about ½ cm to about 1 cm, or any other suitable depth.

Ischial cushioning pads 40 (only one of which is shown in FIG. 1, and which is shown partially cut away) are positioned over the cavities 44. The ischial cushioning pads 40 are closed flexible bags or pouches containing a pressure-relieving fluid. The ischial cushioning pads 40 placed in the ischial cavities 44 are positioned under each of the locations where the ischial tuberosities are expected to contact the saddle. In some embodiments there is a separate ischial cushioning pad for each of the cavities 44. This is illustrated in FIG. 1. In other embodiments there is a single ischial cushioning pad overlying both the left and right cavities 44.

Figure 3:
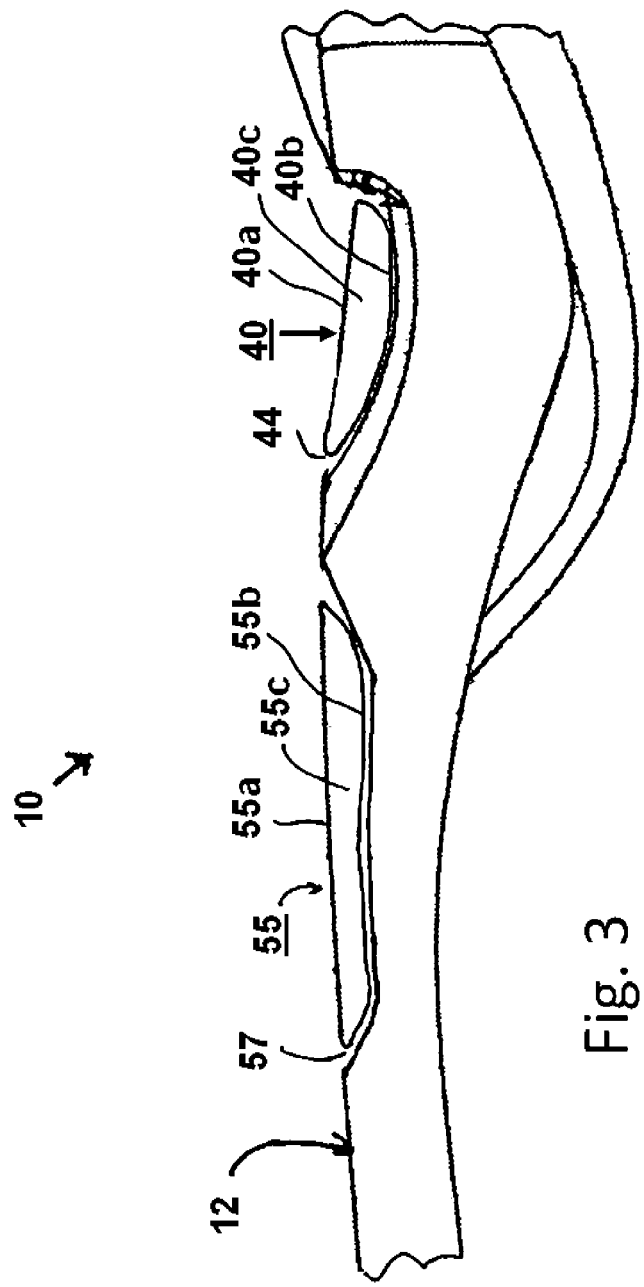
FIG. 3 is a sectional view similar to FIG. 2, but expanded to show additional detail.
Figure 4:
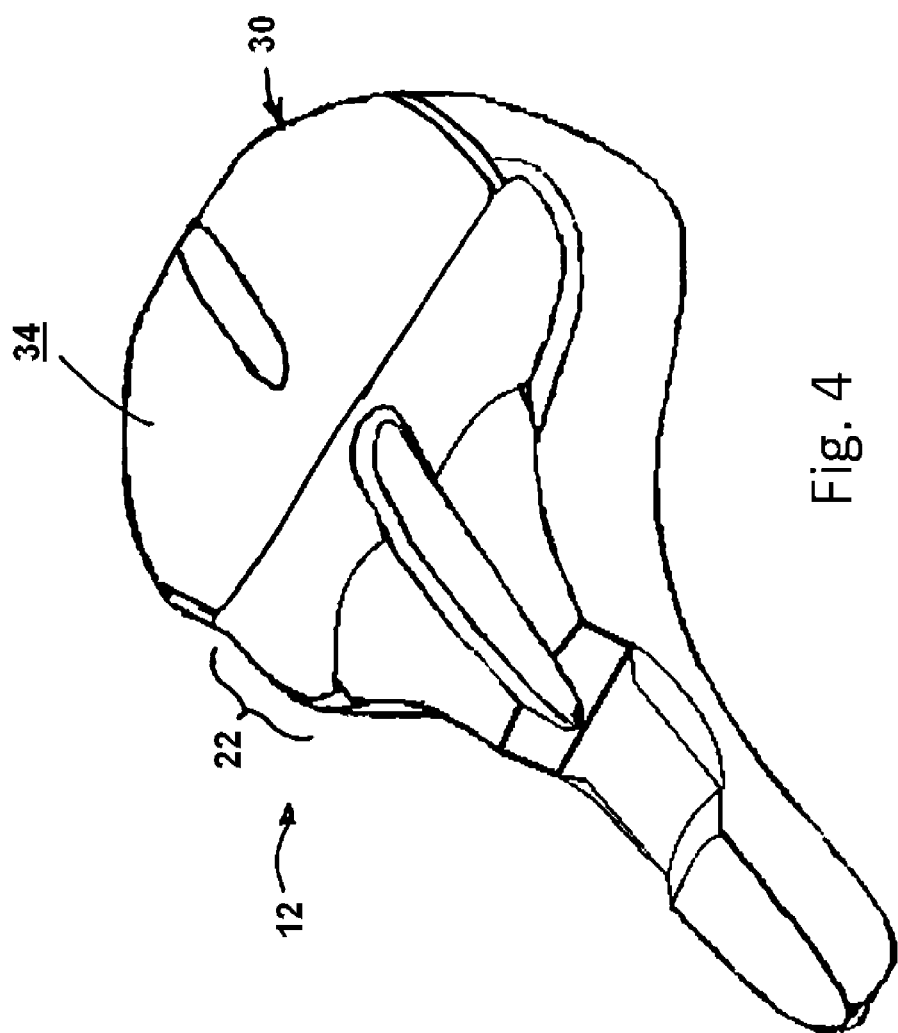
FIG. 4 is perspective view of the saddle of FIG. 1.

The ischial cushioning pads 40 are positioned in the cavities 44, as shown in FIG. 3. The ischial cushioning pads 40 include an upper surface 40*a*, a bottom surface 40*b* and interior space 40*c* for the inclusion of cushioning fluid. In one embodiment the cushioning pad 40 is attached in a manner to allow the upper surface 40*a* to move from side to side with respect to the saddle 12 during pedaling. In another embodiment the cushioning pad 40 is attached in a manner to allow the upper surface 40*a* to move, forward and rearward with respect to the saddle during pedaling. In yet another embodiment the cushioning pad 40 is attached in a manner to allow the upper surface 40*a* to move both from side to side and forward and rearward during pedaling.

The cushioning pads are attached in a manner that allows lateral movement during the pedaling motion to reduce the expected shear forces on the ischials and the tissue underlying the ischials. In one embodiment the bottom surface 40*b* is adhered to the saddle using glue or any other attachment mechanism. The cushioning pad 40 can be squeezed or compressed to shorten its length in the forward and rearward direction during the gluing step to allow a better forward and back movement of the cushioning pad 40 as well as a better conformation to a boney ischial tuberosity.

As further shown in FIGS. 1-4, the saddle includes an optional pubis cavity 57 in the pubis region 20. Placed in the pubis cavity 57 is a pubis cushioning pad 55. In some embodiments more than one pubis cushioning pad 55 is placed in the pubis cavity 57. As shown in FIG. 3, the pubis cushioning pad 55 includes an upper surface 55*a*, a bottom surface 55*b* and interior space 55*c* for the inclusion of cushioning fluid. In one embodiment the cushioning pad 55 is attached in a manner to allow the upper surface 55*a* to move from side to side with respect to the saddle 12 during pedaling. In another embodiment the cushioning pad 55 is attached in a manner to allow the upper surface 55*a* to move, forward and rearward with respect to the saddle during pedaling. In yet another embodiment the cushioning pad 55 is attached in a manner to allow the upper surface 55*a* to move both from side to side and forward and rearward during pedaling. In one embodiment the pubis cavity 57 has a length of about 7 cm, and a width within the range of from about 4 cm to about 7 cm.

For additional pressure relief the entire region of the pubis (including the cushioning pads) can be recessed approximately 1 cm from the level of the front 12 and ischial region 22 of the saddle.

The use of the pubis cavity 57 and pubis cushioning pad 55 protects the female rider or the male riding in the racing position. In one embodiment the volume of the pubis cavity 57 is approximately the same as the volume of the cushioning fluid, so that the surface of the saddle in the pubis region is substantially flat at the location of the pubis cushioning pad 55. In other embodiments, the volume of the cavity 57 is different from the volume of the pubis cushioning pad 55. For some riders the cushioning pads 40 at the ischial tuberosities might not be needed. The pubis cushioning pad 55 can be fixed in the same manner as the ischial pads 40 with front and rear tabs that are glued or otherwise adhered to the underlying foam base. It is to be understood that the bicycle seat 10 can include just the pubis cavity 57 and pubis cushioning pad 55, just the ischial cavities 44 and ischial cushioning pads 40, or both the pubis and ischial cavities and pads.

A covering system that can be used with the bicycle seat is a removable stretch Lycra cover that covers the entire saddle. In one embodiment the covering system is a permanent part of the saddle. In order to achieve the desired stretch feature, a Lycra stretch portion of the cover coincides with the areas where the underlying cushioning pads are attached. This Lycra stretch portion is sewn at its perimeter to the fabric covering the rest of the saddle (usually a "leather" polymer mimicking actual leather. The "leather" covering is usually glued to the underlying foam structure, thus adhering the tabs at the front and rear of the cushioning pads even more securely. The Lycra portion must be free to stretch and move. If necessary, one or more darts can be sewn into the perimeter of the Lycra in order to introduce extra material that can move during pedaling so that the cover does not become an impediment to the movement of the underlying cushioning pad.

If the underlying foam is not coated in some fashion to protect against moisture, then a thin, waterproof, stretchy urethane film can be laminated to the back of the Lycra, which will decrease the ability of the fabric to stretch. In this case, the Lycra portion needs to be loosely fixed to the leather portions of the saddle 12 or the darts mentioned above need to be introduced into the seams. In one embodiment the entire cover is made of this Lycra with urethane laminate (or other stretchable waterproof covering) that is fixed around its edges to the bottom of the saddle.

Figure 7:
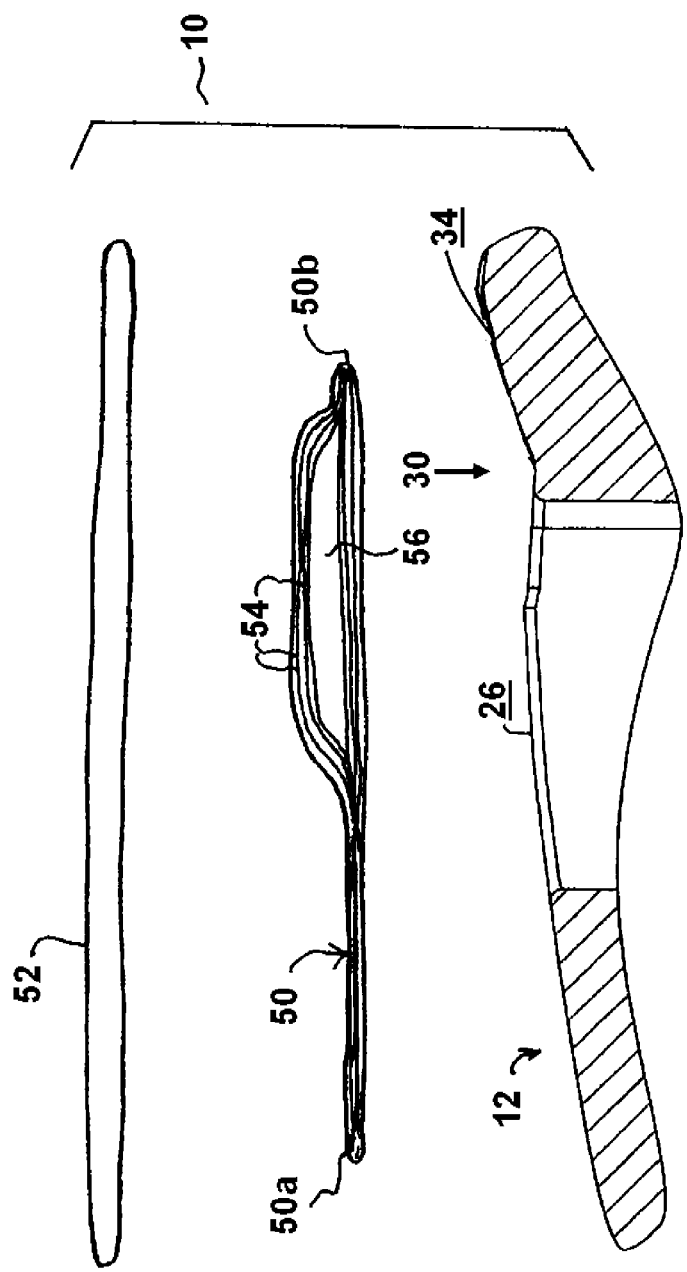
FIG. 7 is an exploded view of a bicycle seat including a saddle, a cushioning pad and a cover.

A method for assembling the seat 10 is illustrated in FIG. 7. The seat 10 includes an assemblage of the saddle 12, a cushioning pad 50 and a cover 52. When assembling the seat 10, as a practical matter, the cushioning pad 50 is attached to the saddle 12, and the cover 52 is applied to the saddle 12 and the cushioning pad 50. The cover is optional.

The cushioning pads are a composite of a number of layers of casing material 54, the layers being shaped in the general shape of a bicycle seat. In one embodiment, there are 6 layers of casing material 54. In other embodiments, the number of layers of casing material 54 is within the range of from about 2 to about 8. The casing material 54 can be made of any suitable substance. In one embodiment the casing material enclosing the fluid is a urethane film of soft durometer (about 80) for maximum flexibility. It has also been found that using multiple layers of thin urethane films, having a thickness of about 5 mil (approximately 0.125 mm), provides adequate strength and improved flexibility at the same time. If the cushioning fluid used is oil based, then an oil-resistant film, such as an oil-resistant polyester urethane film, should be used.

The layers of casing material 54 are bonded together in strategic locations to form one or more cavities 40 for containing cushioning fluid. The casing material 54 is provided to enclose and contain an appropriate pressure-relieving, or cushioning fluid to relieve pressure and shear forces applied to the honey prominences of the rider. The pressure-relieving fluid placed in the cushioning pads 40 and 55 has the property of flowing from points of high pressure to points of low pressure to automatically conform to the anatomical structure of the bicycle rider. This reduces peak pressure points at boney prominences as long as the casing material 54 is constructed so that the boney prominences do not bottom out, and as long as the fluid is encased in a casing that is loose or elastic enough to allow the fluid to conform without any hammocking or resistance from the casing. The casing can have built in wrinkles (extra material) to facilitate the movement of the membrane to provide shear relief. Advantageously, the cushioning fluids have no memory.

The cushioning fluid in the flexible, elastic casing 54 that conforms without resistance to boney prominences can provide at least 1 cm, and as much as 5 cm, of unrestricted forward and back and/or side-to side (lateral) movement in order to transfer the shear forces away from the boney prominences and into the fluid itself. In some embodiments there is also forward and rearward movement. In one embodiment the fluid is polybutelene oil from Ineos: Indopol H300 having a kinetic viscosity within the range of from about 605 to about 655 cSt at 100° C. This is much less viscous than the fluid used in wheelchair cushions, thereby allowing the fluid to shift more easily to reduce shear forces. In other embodiments the fluid could have a kinetic viscosity at 100° C. within the range of from about 200 cSt to about 3200 cSt. Other fluids, including air or other gases, can be used. Air or other gases behave like a fluid to relieve pressure but have the disadvantage of changing volume with temperature and altitude. Air and other gases also are difficult to contain, and provide less stability than viscous fluids.

Figure 5:
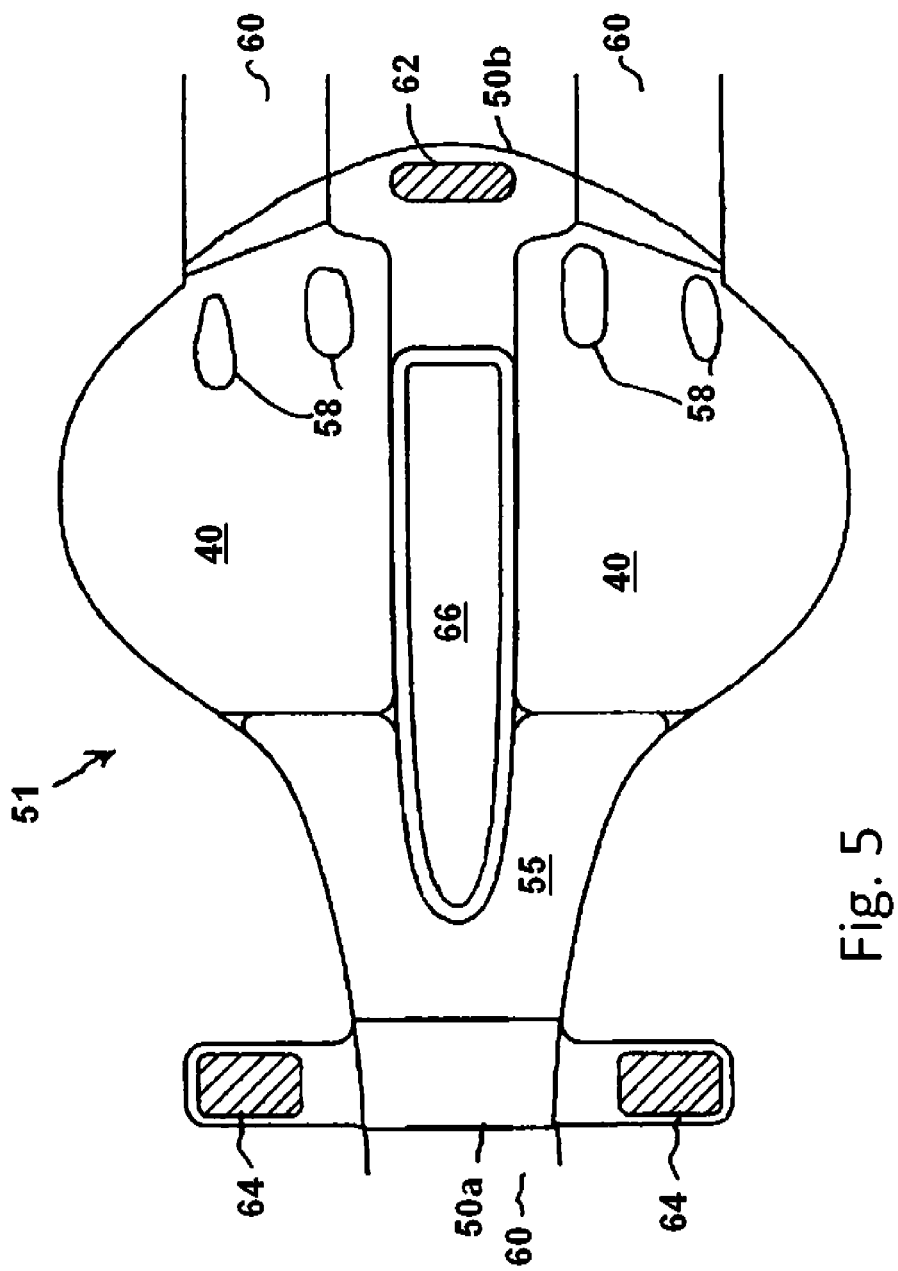
FIG. 5 is a plan view of a cushioning pad for use on a bicycle seat.

FIG. 5 illustrates an embodiment of a bicycle seat in which the ischial cushioning pads 40 and pubis cushioning pads 55 are incorporated into a cover assembly 51 that can be attached to a bicycle saddle. The ischial cushioning pads 40 have tabs at either end allowing such tabs to be glued or otherwise adhered to the underlying foam saddle in such a way that they securely attach the forward and rearward ends of the pads 40 to the saddle, but allow the center portion of the pads to be free to roll from side to side during pedaling. These tabs allow the shrinking of the length of the cushioning pads in the glued position so as to introduce wrinkles and movement of the upper surface of the cushioning pad in the forward and rearward direction. The combination of fluid conformation to the shape of boney prominences, a fluid that moves with the rider's movement, and a pad that is free to roll during pedaling gives a high degree of movement in the underlying pad. The result is a configuration that reduces shear forces and pressure associated with pain during riding.

Fill ports 60, shown in FIG. 5, can be provided in the casing material 54 to enable the casing material 54 to be filled with the cushioning fluid. In one embodiment, the pubis cushioning pad 55 and the ischial cushioning pads 40 weigh less than about 80 g total, including about 25 g of the cushioning fluid in each of three compartments for pads 40 and 55, and 4 to 6 layers of super-flexible urethane casing that is sealed into the desired configuration.

After filling the pads through these ports, it is important not to have a contaminated seal that has insufficient strength to hold up to the high pressures applied when riding. To keep this seal clean during filling, a separate urethane tube is inserted into the filling port. The filling spout is inserted into this tube during filling. When the filling spout is withdrawn after filling, the urethane tube is then pushed into the filled pad so that when the port is sealed shut there is no fluid to contaminate and weaken the seal. If the filling tube is thin, soft and flexible, it will not be felt in the finished pad.

In one embodiment the casing material 54 includes a severe restriction of the total surface area of the cushioning pads at the ischials in order to minimize the amount of fluid needed to prevent bottoming out, while also minimizing thickness and bulk.

Although the cushioning pads 40 are configured in the drawings as a pair of pads, left and right, it is to be understood that the seat 10 can be designed with a single ischial pad. Using two pads helps prevent the fluid from migrating from one side to the other and creating an unlevel seat. Also, using a single pad 40 limits the amount of shear-neutralizing side-to-side movement of the surface of the pad. One solution to this issue is to include a center cutout 26 running down the centerline of the seat. This frees the pads to move from side-to-side to relieve shear forces. When combined with a split saddle having a similar central cutout running from the front to the back of the saddle, it also provides pressure relief along the pudendal nerve. In one embodiment the saddle cutout 26 is about one inch wide or greater.

As shown in FIG. 5, optional bonded areas or segments 58 can be placed in the cushioning pads 40, with the bonding being effective through all the layers of cushioning material 54 to eliminate the flow of the cushioning fluid from particular areas. These segments 58 have rounded corners for greater strength and should not interfere with the filling tube that is inserted into the cushioning pads 40 through the ports through the filling process.

As shown in FIG. 5, the cover assembly 51 can be provided with an optional center cutout 66. This cutout can be aligned with the central cutout 26 of the saddle 12.

During pedaling by the rider, the left and right cushioning pads 40 are somewhat free to move from side-to-side to relieve shear forces. The action can be a rolling action. This is achieved by die cutting and removing the urethane films from the center of the cutout. When combined with the split saddle 12 having the central cutout 26 running forward and rearward, it also provides pressure relief along the pudendal nerve.

The casing material 54 of the cushioning pads 40 and 55 can be filled to any thickness. In one embodiment the pads are filled to a thickness within the range of from about ½ cm to about 2 cm, in the unpressured or relaxed state. Structuring the cushioning pads 40 to minimize the thickness of the fluid at the ischials while still minimizing or preventing bottoming out helps reduce the weight and profile of the cushioning pads 40. Optionally, sealing segments 58 are provided to prevent fluid pooling in less critical areas of the pad 40, i.e., away from the ischials, in order to reduce the amount of fluid needed and to prevent bottoming-out under the ischials.

The value of making the cushioning pads 40 and 55 from easily stretchable material in all directions is that this allows free movement of the upper surfaces 40a and 55a of the cushioning pads 40 and 55 during pedaling. The cushioning pads 40 and 55 can be provided with optional fastening tabs such as rear tab 62 and opposed front fastening tabs 64, shown in FIG. 5. The tabs can be fastened by any suitable fastening arrangement, such as Velcro® strips or buttons, or they can be glued to the foam on the saddle. Other mechanisms besides the fastening tabs 62, 64 can be used to attach the cushioning pads 40 and 55 to the saddle. The cushioning pad 50 can be provided with a central cutout 66. In one embodiment, the cushioning pads 40 and 55 are longer and wider than the underlying saddle 12. This allows the surface of the cushioning pads 40 and 55 to conform without resistance to boney prominences and to move with the movement of the ischials, as described above.

The cushioning pads 40 are attached to the saddle 12 in such a way that the cushioning pads are free to move from side to side and somewhat from front to back. This can be achieved in a number of ways. In one embodiment, the cushioning pads 40 and 55 are attached to the saddle in a limited number of places, with the remainder of the cushioning pad 40 and 55 being free to move relative to the saddle 12 in response to the movement of the rider's body during pedaling. As shown in FIG. 5, the cushioning pads 40 are configured so that they can be attached to the saddle 12 only at the forward end 15a of the saddle 12, with front fastening tabs 64 that secure to each other under the nose of the saddle 12, and at the rearward end 15b of the saddle 12 with rear tab 62. These locations are chosen so that the fastening tabs 62, 64 will not be felt by the rider. By making the cushioning pad at least 1 cm longer than the attachment points, the pad is also free to move from front to back. This allows the cushioning pad to move with the rider, i.e., move relative to the saddle 12 during pedaling. Other attachment points or arrangements can be used while still allowing the cushioning pads 40 to move with the rider and move relative to the saddle 12.

Although not bound by this theory, the combined effects of pressure and shear can be viewed as follows. The forces that cause pain can be described as pressure times shear. Accordingly, if pressure is 2 units and shear is 2 units, then total forces are 4 units. Therefore, if the pressure forces are cut in half (to 1 unit) and the shear forces are also cut in half (to one unit), then total forces can be expressed as 1×1=1, which is a 75% reduction of the original force. The reduction in force achieves a goal of reducing the pain and discomfort associated with conventional bicycle seats.

Example I

Twenty bike riders were asked to take test rides on bicycles using bicycle seats made according to the invention over an experimental and testing period. Pressure mapping showed a reduction in static pressure on the ischials of approximately 20 percent compared with the pressure using a conventional, high end saddle. After riding the bicycles, the testers consistently reported pain relief of 75 percent or more. Without being bound by theory, it appears that the comfort improvement included not only a pressure relief component, but also a shear relief component. Further, it appears that in the saddle application, shear is more important than pressure, and the use of the bicycle seat of the invention must be reducing shear by a very significant amount. A reduction of 75 percent or more of the perceived forces at the ischials and pubis is a huge improvement for riders. This is particularly important for recreational riders who do not build up the tolerance to pressure that elite riders do. The improved seat has been so effective that all 20 testers who tried the saddle during the experimental and testing period have reported an almost total elimination of the pain they used to experience on long rides. This is a confirmation of the effectiveness of relieving both pressure and shear forces.

The use of the rear shelf 30 reduces both the pressure and shear at the ischials. The rear shelf 30 involves building up the foam in areas that do not interfere with pedaling. The most effective place to perform this build-up is behind the ischials. The transition in height from the ischial region to the rear shelf is within the range of from about 1 cm to about 6 cm. In another embodiment, the height difference is about 3½ cm. In other embodiments the height difference is greater than 6 cm or less than 2 cm. The function of the rear shelf 30 is to comfortably build pressure behind the ischials, thus further offloading pressure from the ischials, while also reducing internal shear forces at the ischials. While not being bound by theory, without pressure, there is no shear, and the reduction in pressure engendered by the shelf 30 relieves the shear between muscle and the ischials, as described above. The rear shelf 30 can be built into the underlying saddle, or it can be a separate piece that is held into a cover pocket that is then applied to the user's saddle, as explained below. Alternatively, the rear shelf 30 can be attached to any saddle by any suitable attachment method, such as by gluing or using adhesive tape or using Velcro® attachment strips.

In general, the greater the height differential between the top surface 33 of ischial region and the top of the rear shelf 30, the greater the resulting pressure relief at the ischials. Also, the greater the height differential, the greater the tendency for the bicycle rider's body to slide forward during riding, and the more difficult it is for the rider to change position on the saddle. Further, the greater the height differential, the greater the amount of weight borne on the hands and arms. Therefore, it is generally advantageous to limit the height differential to a height sufficient to provide the desired pressure and shear relief on the ischials. It is advantageous to position the beginning of the rear shelf 30 directly behind the ischials—or at a position within the range of from about 6 cm to about 8 cm forward of the rear 15b of the saddle 12. Furthermore, the height of this build-up of the rear shelf 30 can be reduced by employing the cavities 44, as discussed above. By immersing the ischials ½ cm to 1 cm further into the saddle 12, this same amount of height is effectively added to the foam height of the rear self 30 for extra pressure relief.

Another advantage of the foam build-up of the rear shelf 30 is that it tends to put the pelvis into the proper anatomical position. The foam buildup of the rear shelf 30 tends to push the pelvis forward into a more neutral pelvic tilt. With conventional bicycle seats, when riding, the pelvis has a tendency to tilt backward, creating back bowing, and muscle strain. The effect of a neutral or slightly forward pelvic tilt is to better engage the glute muscles for more effective pedaling and to relieve strain on the muscles of the lower back. Another advantage is that the combination of the fluid conformation and movement along with any foam in the saddle itself helps absorb and smooth out bumps in the road. In one embodiment the saddle 12 is covered by at least ½ cm to about 1 cm of foam at every point touching the body.

The cover 52, shown in FIG. 7, can optionally be a stretch lycra cover, although the cover 52 can be made of any suitable material as long as it does not interfere with pressure or shear relief. The cover 52 can be sewn from lycra stretch fabric and applied over the saddle in such a way that it snugly fits the saddle 12. The cover 52 can be an elastic lycra fabric that is shaped exactly to the saddle 12 and is made in one piece with no seams that can be felt by the rider and is stretchy enough to move and conform freely under the boney prominences.

The cover needs to be elastic enough not to interfere with the conformation or movement of the underlying cushioning pads 40 and 55. Polyester/lycra or nylon/lycra blends can be used. In one embodiment, the cover fabric has a weight within the range of from about 3 ounces to about 10 ounces per square yard (about 71 g to about 236 g per square meter). The cover can have a "shower cap" design that stretches over the entire saddle, or it could be secured with Velcro® strips or other attachments. In one embodiment, the Lycra fabric is located in a relaxed unstretched state over the cushioning pads and sewn around the perimeter of the rest of the saddle. Alternatively, the entire cover can be Lycra and secured to the underside of the saddle. In one embodiment the cover is sewn into the saddle so that it is not readily removable.

Figure 8:
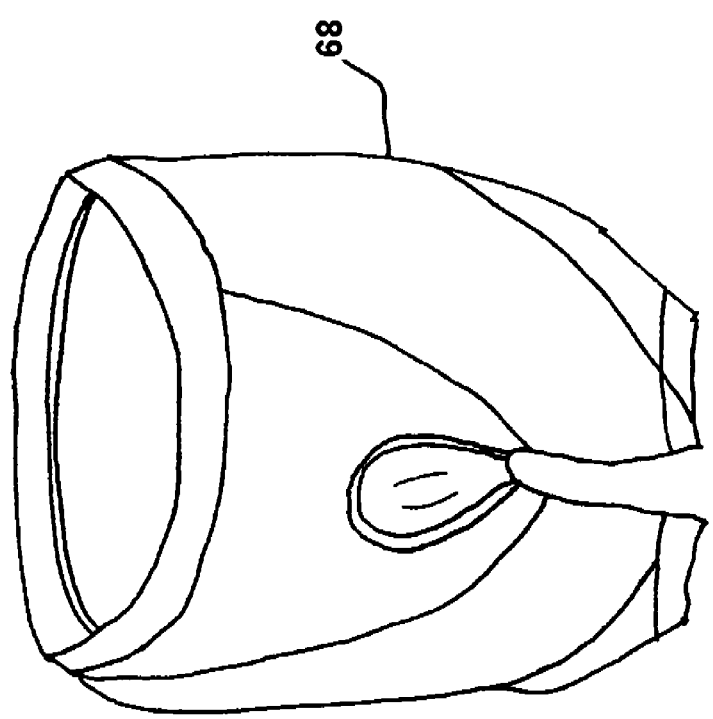
FIG. 8 is a schematic view in perspective of bicycle pants including the cushioning pad.

While the cushioning pads 40 and 55 are shown as being applied to the saddle 12 to provide the appropriate cushioning for the rider, in another embodiment the cushioning pad 50 is positioned in bicycle pants, such as the bicycle pants 68 shown in FIG. 8. The pants 68 have a pocket suitable for insertion of the cushioning pad, and the rider sits directly on the saddle 12 during pedaling. Other methods of attachment of the cushioning pads 40 and 55 to the pants 68 can be used.

As described above, and as illustrated in FIG. 6, the rear shelf 530 can be in the form of a wedge, having a substantially wedge-shaped cross-sectional profile. While the wedge is shown as being integrally formed on the saddle 12, it is to be understood that the rear shelf, having a wedge-shaped cross-section, can be a separate element or block. In such a case, the separate rear shelf element can be applied to any bicycle seat, including conventional bicycle seats, to provide the step or height difference which gives the pressure relief to the boney prominences. Also, the separate rear shelf element can be incorporated into bicycle pants 68 to provide the step or height difference which gives the pressure relief to the boney prominences.

Example II

During a 6 day, 500 kilometer test ride in the hills of the Basque country of Spain five bicycle riders used the improved bicycle seat of the invention. Of the five riders, four of them had a history of significant redness, pain and/or blistering on the buttocks when riding 75 k per day. All five riders used the bicycle seat with the rear shelf 30 and cushioning pads 40 under the ischials. For all four of the riders having previous seat problems on long rides, the improved seats solved their pain problem and helped clear up whatever blistering occurred. They were "amazed" at the effectiveness of this new seat. Furthermore, they all rode comfortably on a seat that was supportive and did not cause any other discomforts, such as back pain or inordinate pushing forward on their handlebars.

Figures 9, 10:
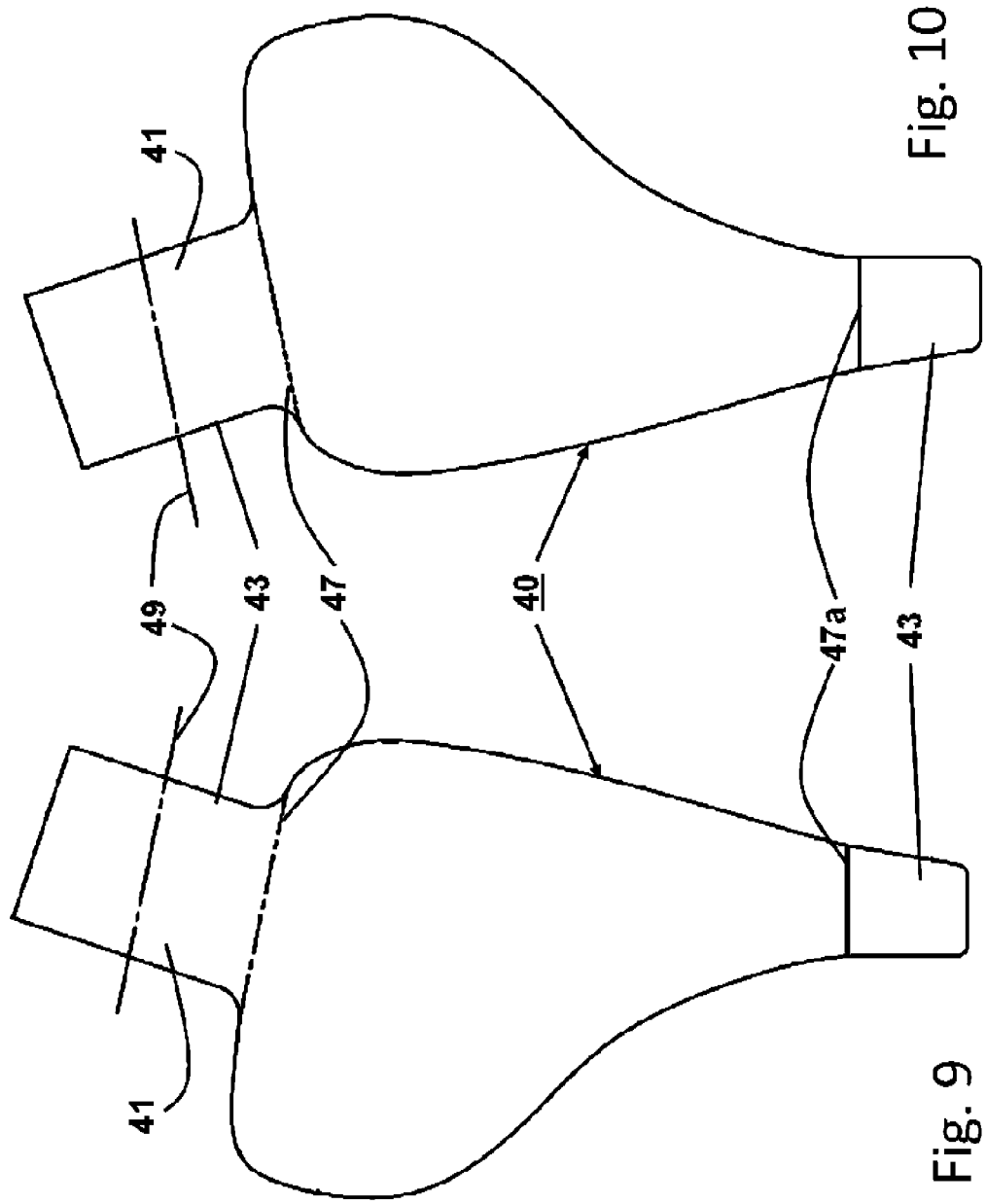
FIGS. 9-11 are schematic plan views of the cushioning pads.
Figure 11:
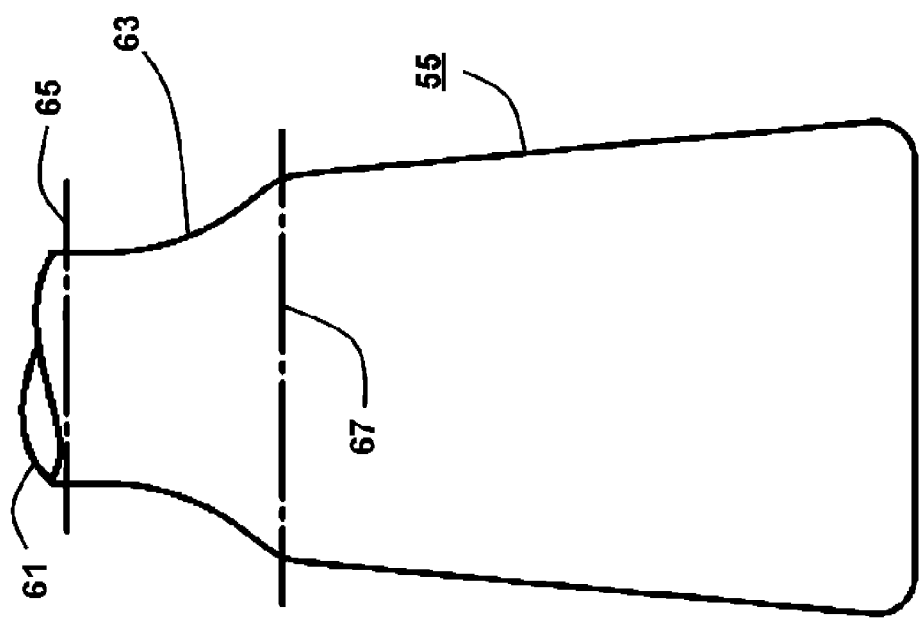

FIGS. 9-11 show the elevational view of the cushioning pads 40 and 55 prior to filling. In FIGS. 9 and 10 the cushioning pads 40 are filled with the cushioning fluid using fill spout 41. After the cushioning pads 40 are filled and sealed at seal line 47, the fill spout 41 is cut along trim line 49, thereby forming a glue tab 43 useful in attaching the cushioning pads 40 to the bicycle saddle 12. At the other end of the cushioning pad 40 seal line 47a defines the opposite glue tab 43.

As shown in FIG. 11, the cushioning pad 55 is filled with the cushioning fluid using fill spout 61. After the cushioning pad 55 is filled and sealed along seal line 67, the fill spout 61 is cut along trim line 65, thereby forming a glue tab 63 useful in attaching the cushioning pad 55 to the bicycle saddle 12.

The embodiments shown in the drawings and described in the specification include cushioning pads 40, 55 that contain a cushioning fluid. It is to be understood that the cushioning pads can contain other cushioning materials, including, but not limited to, gaseous substances, gels and foams.

The principle and mode of operation of this invention have been described in its preferred embodiments. However, it should be noted that this invention may be practiced otherwise than as specifically illustrated and described without departing from its scope.

What is claimed is:

1. A bicycle seat comprising:
   a bicycle saddle having a forward end and a rearward end; and
   one or more cushioning pads placed on the saddle, the one or more cushioning pads having an upper surface, with the one or more cushioning pads being connected to the saddle in a manner that enables the upper surface of the one or more cushioning pads to move, as a result of movement of a bicycle rider's legs during pedaling, either from side to side with respect to the saddle, or forward and rearward with respect to the saddle, or both from side to side and forward and rearward, where the one or more cushioning pads include a casing that contains a cushioning fluid, with the casing being loose enough or elastic enough to allow the cushioning fluid to conform to pressure without hammocking or resistance from the casing, thereby allowing the upper surface of the one or more cushioning pads to move from side to side, or forward and rearward, or both side to side and forward and rearward, substantially without resistance, thereby reducing shear forces that are created from the movement of the bicycle rider's boney prominences against the underlying tissue as the rider pedals.

2. The bicycle seat of claim 1 in which the one or more cushioning pads are connected to the saddle only at a forward end of the cushioning pads and a rearward end of the cushioning pads.

3. The bicycle seat of claim 1 in which the one or more cushioning pads contain a cushioning fluid that has a kinetic viscosity less than about 2000 cSt at 100° C.

4. The bicycle seat of claim 1 in which the cushioning fluid has no memory.

5. The bicycle seat of claim 1 in which the one or more cushioning pads comprise a bag having a volume that exceeds the volume of the cushioning fluid contained within the bag, thereby forming wrinkles of excess bag material in the pads.

6. The bicycle seat of claim 1 including a seat cover positioned over the saddle and the one or more cushioning pads, the seat cover having sufficient flexibility to enable the seat cover to move with the upper surface of the one or more cushioning pads during pedaling.

7. The bicycle seat of claim 1 in which the one or more cushioning pads are connected to the saddle in a manner that enables the upper surface of the one or more cushioning pads to move at least 1 cm during pedaling.

8. A bicycle seat comprising:
   a bicycle saddle having a forward end and a rearward end; and
   one or more cushioning pads placed on the saddle, the one or more cushioning pads having an upper surface, with the one or more cushioning pads being connected to the saddle in a manner that enables the upper surface of the one or more cushioning pads to move, as a result of movement of a bicycle rider's legs during pedaling, either from side to side with respect to the saddle, or forward and rearward with respect to the saddle, or both from side to side and forward and rearward, where the one or more cushioning pads include a casing that contains a cushioning fluid, with the casing having a volume that exceeds the volume of the cushioning fluid contained within the casing, thereby allowing the upper surface of the one or more cushioning pads to move from side to side or forward and rearward, or both side to side and forward and rearward, substantially without resistance, thereby reducing shear forces that are created from the movement of the rider's boney prominences against the underlying tissue as the rider pedals.

9. The bicycle seat of claim 8 in which the one or more cushioning pads are connected to the saddle only at a forward end of the cushioning pads and a rearward end of the cushioning pads.

10. The bicycle seat of claim 8 in which the one or more cushioning pads contain a cushioning fluid that has a kinetic viscosity less than about 2000 cSt at 100° C.

11. The bicycle seat of claim 8 in which the cushioning fluid has no memory.

12. The bicycle seat of claim 8 including a seat cover positioned over the saddle and the one or more cushioning pads, the seat cover having sufficient flexibility to enable the seat cover to move with the upper surface of the one or more cushioning pads during pedaling.

13. The bicycle seat of claim 8 in which the one or more cushioning pads are connected to the saddle in a manner that enables the upper surface of the one or more cushioning pads to move at least 1 cm during pedaling.

14. A bicycle seat comprising:
a bicycle saddle having a forward end and a rearward end; and
one or more cushioning pads placed on the saddle, the one or more cushioning pads having an upper surface, with the one or more cushioning pads being connected to the saddle in a manner that enables the upper surface of the one or more cushioning pads to move, as a result of movement of a bicycle rider's legs during pedaling, either from side to side with respect to the saddle, or forward and rearward with respect to the saddle, or both from side to side and forward and rearward, where the upper surface of the one or more cushioning pads is capable of at least 1 cm of movement, side to side, forward and rearward, or both side to side and forward and rearward, relative to the saddle.

15. The bicycle seat of claim 14 in which the one or more cushioning pads are connected to the saddle only at a forward end of the cushioning pads and a rearward end of the cushioning pads.

16. The bicycle seat of claim 14 in which the cushioning pads contain a cushioning fluid having a kinetic viscosity less than about 2000 cSt at 100° C.

17. The bicycle seat of claim 14 in which the one or more cushioning pads contain a cushioning fluid, with the cushioning pads include a bag having a volume that exceeds the volume of the cushioning fluid contained within the bag, thereby forming wrinkles of excess bag material in the pads.

18. The bicycle seat of claim 14 including a seat cover positioned over the saddle and the one or more cushioning pads, the seat cover having sufficient flexibility to enable the seat cover to move with the upper surface of the one or more cushioning pads during pedaling.

19. The bicycle seat of claim 14 in which the one or more cushioning pads contain a cushioning fluid that has no memory.

20. A bicycle seat comprising:
a bicycle saddle having a forward end and a rearward end; and
one or more cushioning pads placed on the saddle, the one or more cushioning pads having an upper surface and a lower surface, with the one or more cushioning pads being connected to the saddle by at least one point of the lower surface such that the upper surface of the one or more cushioning pads being free to roll is enabled to move freely in at least one of a rolling movement from side to side or a front to back movement relative to the saddle during pedaling, thereby reducing shear forces that are created from the movement of the bicycle rider's boney prominences against the underlying tissue as the rider pedals.

21. The bicycle seat of claim 20 in which the one or more cushioning pads contain a cushioning fluid that has a kinetic viscosity less than about 2000 cSt at 100° C.

22. The bicycle seat of claim 20 in which the cushioning fluid has no memory.

23. The bicycle seat of claim 19 in which the one or more cushioning pads comprise a bag having a volume that exceeds the volume of the cushioning fluid contained within the bag, thereby forming wrinkles of excess bag material in the pads.

24. The bicycle seat of claim 20 including a seat cover positioned over the saddle and the one or more cushioning pads, the seat cover having sufficient flexibility to enable the seat cover to move with the upper surface of the one or more cushioning pads during pedaling.

25. The bicycle seat of claim 11 in which the one or more cushioning pads are connected to the saddle in a manner that enables the upper surface of the one or more cushioning pads to move at least 1 cm during pedaling.

* * * * *